(12) United States Patent
Rosado

(10) Patent No.: US 9,289,800 B1
(45) Date of Patent: Mar. 22, 2016

(54) COMBINATION SCOOPER AND SIFTER AND METHOD FOR SORTING PLANT MATERIAL

(71) Applicant: James Rosado, Acampo, CA (US)

(72) Inventor: James Rosado, Acampo, CA (US)

( * ) Notice: Subject to any disclaimer, the term of this patent is extended or adjusted under 35 U.S.C. 154(b) by 0 days.

(21) Appl. No.: 14/515,440

(22) Filed: Oct. 15, 2014

(51) Int. Cl.
*B07B 1/49* (2006.01)
*B07B 1/02* (2006.01)

(52) U.S. Cl.
CPC ........................................ *B07B 1/02* (2013.01)

(58) Field of Classification Search
CPC .............................................. B07B 1/02
USPC .......................................... 209/417, 418, 419
See application file for complete search history.

(56) References Cited

U.S. PATENT DOCUMENTS

| | | | | |
|---|---|---|---|---|
| 1,421,245 | A * | 6/1922 | Johnson | A47J 43/22 209/403 |
| 2,072,324 | A * | 3/1937 | Wolcott | A47J 31/14 210/467 |
| 2,670,557 | A * | 3/1954 | Pachner | A01K 97/05 209/418 |
| 2,960,230 | A | 11/1960 | Fracker | |
| 3,627,128 | A * | 12/1971 | Ostrowsky | A47J 43/22 209/236 |
| 3,851,763 | A | 12/1974 | Ball | |
| 4,822,090 | A * | 4/1989 | Kim | B03B 5/02 209/419 |
| 5,325,971 | A * | 7/1994 | Moran | B07B 1/02 209/235 |
| 5,622,266 | A * | 4/1997 | Curtis | B07B 1/005 209/235 |
| 5,848,697 | A | 12/1998 | Eash | |
| 5,850,923 | A | 12/1998 | DeCoster | |
| 6,209,729 | B1 * | 4/2001 | Brouillard | E04H 4/1609 15/1.7 |
| 8,544,917 | B2 | 10/2013 | St James | |
| 9,027,758 | B2 * | 5/2015 | Lee | A47J 43/22 209/233 |
| 2006/0180512 | A1 * | 8/2006 | Allen | A01B 1/00 209/418 |
| 2014/0042106 | A1 * | 2/2014 | Davison | A47J 19/00 210/767 |
| 2014/0251890 | A1 * | 9/2014 | Miller | A47J 43/24 210/238 |

* cited by examiner

*Primary Examiner* — Terrell Matthews
(74) *Attorney, Agent, or Firm* — Larry E. Severin

(57) ABSTRACT

A combination scooper and sifter and method for sifting material includes a solid frame; a mesh screen at the bottom of the frame; a rim at the top of the frame; a rear wall that extends down from the rim to the mesh screen at a steep, first angle; a lip at the front of the frame that extends down from the front of the frame to the mesh screen at a shallow, second angle which is substantially less than the first angle at the back of the frame; a front section at a front of the rim that slopes down to a front tip of the frame; a rear section at a rear of the rim that is generally flat; and a hump-like, middle section between the front and rear sections of the rim that smoothly rises and lowers to provide a hump.

19 Claims, 6 Drawing Sheets

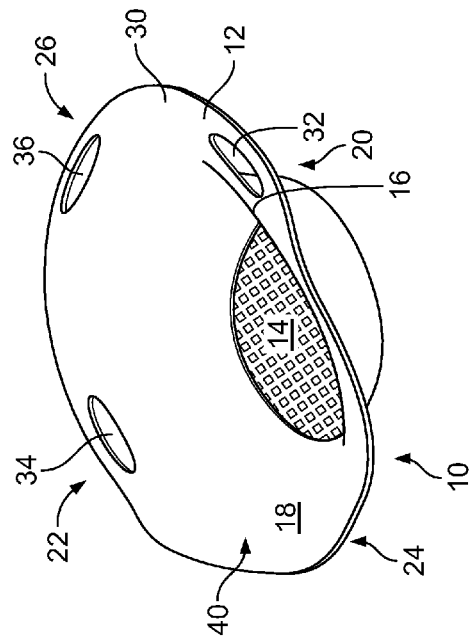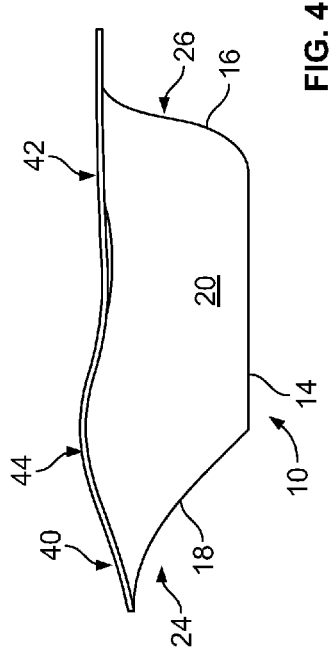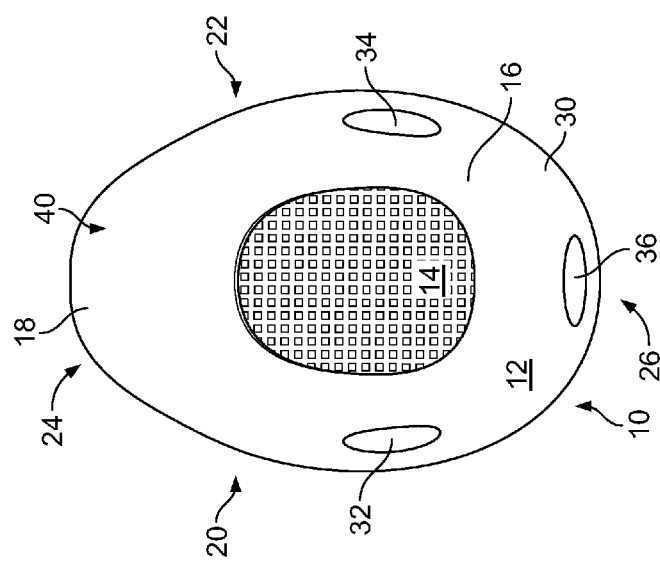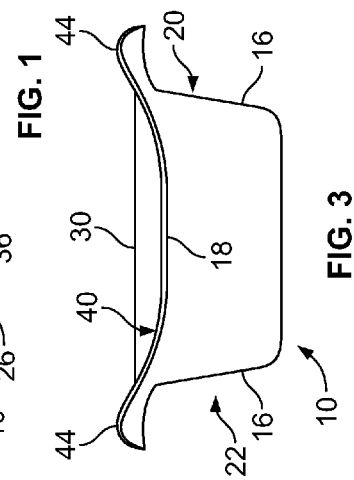

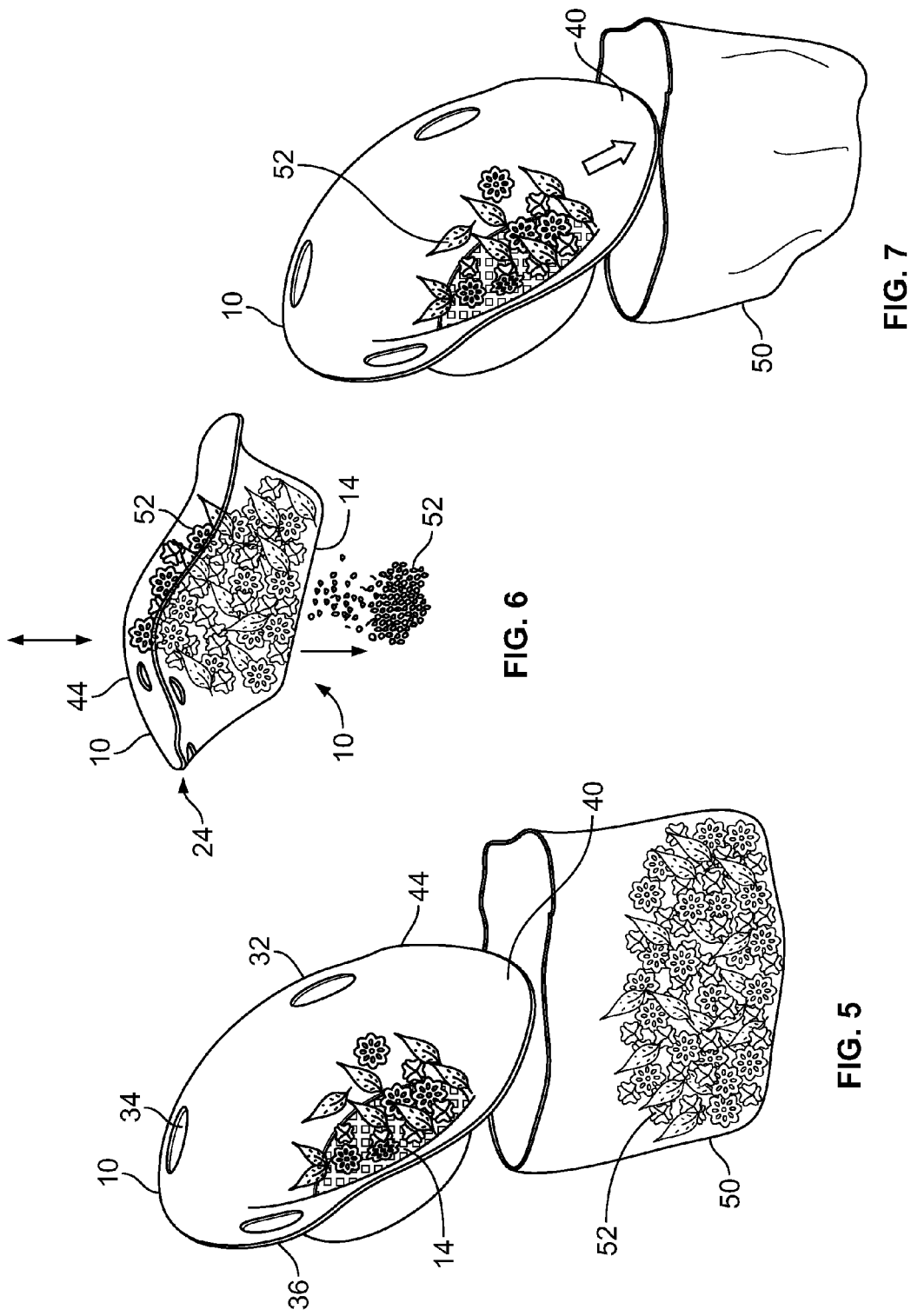

COMBINATION SCOOPER AND SIFTER AND METHOD FOR SORTING PLANT MATERIAL

BACKGROUND OF THE INVENTION

The present invention generally relates to sifters and more specifically to a combination scooper and sifter and method for sorting plant material.

Existing sifters are not designed to aid in scooping, sifting and separating plant parts such as, but not limited, to flowers, buds, petiole, pistols, stems, leaves, seeds, branches, plant particles and/or plant particle dust, or "shake" (referred to herein "plant material"). Usage of existing sifters to scoop, sift and sort plant material could be inefficient. Existing sifters could cause significant damage to delicate and sensitive plant and flower parts such as but not limited to flowers, buds, trichomes, pistols or any pubescent plants that may or may not be glandular.

Existing sifters are not designed for use with delicate or sensitive plant parts. Existing sifters do not allow the end user to scoop up delicate or sensitive plant materials with minimal damage to plant matter. Existing sifters may not allow the end user to sift and sort delicate and/or sensitive plant materials with minimal shaking, and therefore do not maximize the integrity of the plant material resulting in damage and degradation of plant material. Existing sifters usually incorporate a single size of mesh screen apertures which would not be adaptable to the numerous species of plants. Existing sifters do not incorporate rounded off lips on the scooper/dump side to minimize damage or degradation to delicate and/or sensitive plant and flower parts and do not incorporate sloped walls strategically placed to minimize delicate and/or sensitive plant parts from falling out. Existing sifters are not designed to separate more desirable plant material from less desirable plant material.

It would be desirable to have a specialized sifter that may minimize damage to delicate or sensitive plant parts while allowing the end user to efficiently separate more desirable plant material from less desirable plant materials.

SUMMARY OF THE INVENTION

In one aspect of the present invention, a device includes a solid frame having a top, a bottom, a front, a rear, a left, and a right; a mesh screen at the bottom of the frame; a rim at the top of the frame that extends around the rear, left, and right of the frame; a rear wall at the back of the frame that extends down from the rim to the mesh screen at a steep, first angle; a lip at the front of the frame that extends down from the front of the frame to the mesh screen at a shallow, second angle which is substantially less than the first angle at the back of the frame; a front section at a front of the rim that slopes down to a front tip of the frame; a rear section at a rear of the rim that is generally flat; and a hump-like, middle section between the front and rear sections of the rim that smoothly rises and lowers to provide a hump.

In another aspect of the present invention, a device includes a solid frame having a top, a bottom, a front, a rear, a left, and a right; a mesh screen removably held to the frame at the bottom of the frame; a rim at the top of the frame that extends around the rear, left, and right of the frame; a rear wall at the back of the frame that extends down from the rim to the mesh screen at a steep, first angle of at least 70 degrees; a left wall at the left of the frame that extends down from the rim to the mesh screen at the first angle; a right wall at the right of the frame that extends down from the rim to the mesh screen at the first angle; a lip at the front of the frame that extends down from the front of the frame to the mesh screen at a shallow, second angle which is substantially less than the first angle; a front section at a front of the rim that slopes down to a front tip of the frame; a rear section at a rear of the rim that is generally flat; a hump-like, middle section between the front and rear sections of the rim that either smoothly rises and lowers to provide a hump; and a plurality of apertures in the rim to provide handles.

In yet another aspect of the present invention, a method for sorting a plant material includes providing the device described above; inserting the lip of the device into a bag containing the plant material; removing the plant material from the bag into the device, the plant material having larger plant parts and smaller plant parts; and shaking the material using the device so that the smaller plant parts fall down through the mesh screen but the larger plant parts are retained in the device.

BRIEF DESCRIPTION OF THE DRAWINGS

FIG. 1 depicts a top view of an embodiment of the present invention;

FIG. 2 depicts a perspective view of the embodiment of FIG. 1;

FIG. 3 depicts a front view of the embodiment of FIG. 1;

FIG. 4 depicts a side view of the embodiment of FIG. 1;

FIG. 5 depicts an embodiment of the prevent invention scooping material from bag;

FIG. 6 depicts the embodiment of FIG. 5 shaking material;

FIG. 7 depicts the embodiment of FIG. 5 replacing the material in the bag;

DETAILED DESCRIPTION

Figure 8:
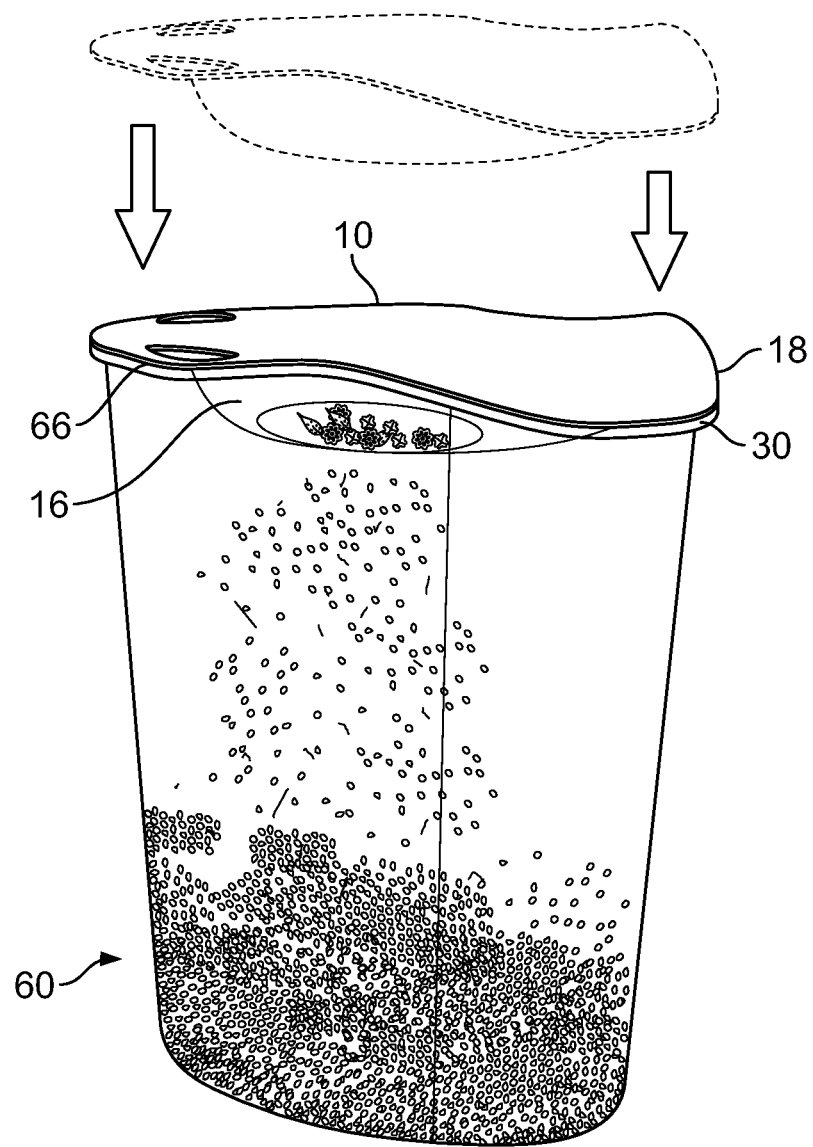
FIG. 8 depicts a system including an embodiment of a system according to the present invention.

The preferred embodiment and other embodiments, which can be used in industry and include the best mode now known of carrying out the invention, are hereby described in detail with reference to the drawings. Further embodiments, features and advantages will become apparent from the ensuing description, or may be learned without undue experimentation. The figures are not necessarily drawn to scale, except where otherwise indicated. The following description of embodiments, even if phrased in terms of "the invention" or what the embodiment "is," is not to be taken in a limiting sense, but describes the manner and process of making and using the invention. The coverage of this patent will be described in the claims. The order in which steps are listed in the claims does not necessarily indicate that the steps must be performed in that order.

An embodiment of the present invention generally provides a combined manual sifter and scooper for material in bags or in a pile. Embodiments include a hand-held sifter and scoop for most or all plant material including plants, flowers, buds, cannabis or herbal materials, such as flowers or flowering plants that seed. Embodiments may separate desirable plant material from less desirable material by sifting smaller particles out and keeping larger particles. Embodiments may separate flowers from leaf, separate seed from flowers, or separate and sort out undesirable plant materials or particles of any other plant, herb, bud, flower, seed, or cannabis particles ("shake"). The plant material to be sifted and sorted may include, e.g., a fruiting body or inflorescence of flowers and seeds such as found in cannabis. In an embodiment, the material may be provided in bags, scooped out of the bag with the invention, and then the undesirable plant parts ("shake") may be sifted from the more desirable plant material with the invention.

Embodiments may include a scoop with a handle or hand holds and a steel, metal, plastic, or other mesh screen at the bottom. The front end is a scooper to scoop material out of a bag or other container, and the rear end is for holding material above a sieve. The device is not symmetrical from front to back, and it drops down at the front end. Embodiments may have a lip at the front, but not have a substantial front wall. The front end may be a solid plate for scooping, and the rearward area is a sifter with a downward-bulging mesh screen. The holes in the mesh screen may be from 1/100 inch to 1 inch for each square grid, so that smaller plant parts such as seeds, leaf, or other undesirable plant, herb, bud, flower, or cannabis particles will be sifted out. Example materials for the body include, but are not limited to, plastic (low cost) and stainless steel (high quality). Embodiments of frames, walls, and other parts of the apparatus may also be constructed of mesh screen to increase surface areas of screen and minimize shaking, damage, and degradation to the plant material.

Example side and rear walls may have a vertical portion or nearly vertical slopes, such as 70% to 90% relative to the bottom. The bottom surface of an embodiment of a device may be flat or slightly curved, and made of a wire, plastic, or other mesh screen. The rest of the device may be made other shaped material such as, for example, plastic, metal, or fiberglass. The mesh screen may include, but is not limited to, a circle, ellipsoid, or ovoid shape, or may be like a square, rectangle or trapezoid with rounded corners. The walls and front lip of the bowl all slope down to the screen and end at the screen. The screen may cover or substantially cover the bottom-most portion of the device.

The walls steeply extend down in that, when the scooper is held horizontally, the material to be sifted adjacent to or in contact with the walls will immediately fall or tumble down onto the mesh screen at the bottom. The lip gently slopes down in that the gentle slope provides a smooth, rounded lip that both scoops material out of a bag while keeping damage to material to a minimum, and also helps retain material while shaking. Embodiments of a lip may strike a balance between a gently-sloped shovel for collecting and dumping a maximum amount of plant material and a vertical wall that retains the material during shaking. The edges of the lip may be rounded and smooth, to help minimize damage to the plant material.

An alternate embodiment may include a separate stand for the sifter so that the sifted material will fall into a collection bin or container. The user uses the device to scoop up plant material out of a bag, then the user sets the device on the stand, which also acts as a container, collection bin or reservoir. Embodiments may include a collection bin having an upper rim that conforms to all or some of the contours of the sifter. The collection bin may be large enough to enclose the wire mesh portion of the scooper, so that the scooper fits into the collection bin. The container may be slightly larger than the scooper, to give the user room to shake the scooper back and forth yet still keep the mesh screen over the bucket so that the bucket collects all the sifted out material ("shake"). The container may be made of any rigid, sealed materials, such as plastic, wood, metal, or mesh, and may include one or more mesh screens of its own. The additional ascreens may help with additional sifting or sorting needs, such as a second screen with a different, perhaps smaller mesh hole size which provides a second separation of plant material. The upper lip of the container may match either some of or all of the rim of the scooper. The sides of the container may snugly fit the sides of the scooper or have a gap, the back of the container may match the back of the scooper, and the front of the container may have a gap.

Another alternate embodiment may have a single handle that extends out from the rear wall of a sifter, rather than multiple apertures in a flat rim. The walls on the left, right, and rear may be generally straight, with or without a horizontal rim at the top. The front lip may have a more gentle slope than the straight walls. A trough portion or bulge may extend down from the bottom of the frame, located at or near the front edge of the mesh screen. If the device is tilted back while shaking, the plant material will be retained within the scooper by the trough. The mesh screen may be angled or bent so that a lower portion covers the bottom and an upper portion extends up onto the real wall, effectively increasing the amount of screen area to which the plant material is exposed. In an embodiment, the entire apparatus or any parts of the apparatus may be made out of mesh screen to maximize screen area. An embodiment may be tilted at different angles to increase efficiency of the device. This may allow the device to be tilted back in use so that the screen sifts the plant material on both the bottom and rear wall of the device. Embodiments may have a removable mesh screen.

An embodiment of a mesh screen matches the shape and corresponds to the large aperture in the bottom of the frame. The screen may have its own rim, which has one or more connecting elements and a rear connecting element. The connecting elements may be tabs in the rim, male to female connectors, or fasteners such as screws and bolts. The screen rim may be threaded and may screw onto corresponding threads in the frame to engage a tight connection. The connecting elements may be located around the rim, and will connect or disconnect the rimmed screen from the rest of the scooper. The frame may also have one or more corresponding connecting elements such as flanges to engage with the connecting elements in the screen, and a connecting receptacle that attaches to the rear connecting element on the screen. A user may connect or disconnect the mesh screen onto the frame so that the connecting elements in the frame releasably retain the mesh screen and the rear connecting element of the screen fastens onto the receptacle of the frame.

As shown in FIGS. 1 and 2, embodiments may include a combined scooper and sifter 10 with a solid frame 12 and a mesh screen bottom 14. Embodiments may be symmetrical from left side 20 to right side 22, but not from front 24 to rear 26. The frame 12 has a generally flat rim 30 that extends around the side and rear portions 20, 22, and 26. The frame 12 has walls 16 on three sides that steeply extend down from the rim 30 to the mesh screen bottom 14, and a front lip 18 on the front side that gently slopes down to the mesh screen bottom 14 to form a front scoop area 40. The walls 16 are steeply sloped near the rear 26, and the front lip 18 is slightly or shallowly-sloped near the front 24. The rim 30 may have a left handle aperture 32 on the left side 20, a right handle aperture 34 on the right side 22, and a rear handle aperture 36 at the rear 26.

As depicted in the embodiment of FIGS. 3 and 4, the left side 20, right side 22, and rear 26 walls 16 may have a rounded bottom or top or both, to form an elongated "S" or integral sign. The front 24 wall 16 slopes up more gently than the side 20, 22 or rear 26 walls 16, to provide a front scoop area. The rear 26 portion of an embodiment may appear like a bowl, with sharply-sloping walls.

As depicted in the side view of FIG. 4, the profile from the side of an embodiment of a scooper 10 may have slightly downward sloping flat rear portion 42 at the top of the rear 26 and side 20 portions, with a rise or hump-like portion 44 starting at about the middle of the scooper 10, and then a downward sloping front scoop area 40 that ends in the front 24 at a level slightly below the flat rear portion 42. The top surface may of the scooper be generally level from the center to the back 42, with a gentle rising and lowering shape 44 ending in a scoop area 40. The hump-like portion 44 in the top surface may peak above the point where screen 14 at the bottom ends.

As depicted in the embodiment of FIG. 5, a combined scooper and sifter 10 may be inserted into a bag 50 or other container, and material 52 may be removed from the bag 50 using the scooper 10. The material 52 may include, but is not limited to plant, herb, bud, flower, or cannabis material or plant parts, from plants such as sage, cannabis, lavender or basil. An appropriate wire, metal, or plastic mesh size for the screen 14 may be selected prior to use. The material 52 may be gently shaken so that less-desirable plant parts such as leaf particles, pistols, seeds, stems, dust, or shake sinks to the bottom and then out through the screen. The bag 50 may be a convenient size for packing flowers and leaves, such as a "turkey bag" (19"×23½") or similar sized bag or pouch. The front scoop area 40 at the front of the device will smoothly fit into the bag 50 and scoop up the material 52. If the user does not wish to scoop plant matter from a bag, the user may fill the sifter with plant matter by hand or from a pile of plant material. The scoop 10 has a contour or hump-like portion 44 to direct it into the bag 50, and handle apertures 32, 34, 36 or other handles for a user to grasp. Embodiments (not shown) may include a detachable or fixed stick or pole at the back or a socket for such a stick, which may serve as a handle.

As depicted in FIG. 6, an embodiment of a scooper 10 may be filled with plant material 52 including leaves and flowers, and the device can shaken so that undesirable plant parts are separated from desirable plant parts and sifted out the mesh screen bottom 14. While shaking the device, some plant matter may tend to migrate toward the front 24, but will be retained within the scooper 10 by the hump-like portion 44 in the rim. Less plant material will pop out, compared to a round bowl or a device with a level top rim. The plant material may include, but is not limited to, flowers, pistols, leaves, seed, petiole, stems, buds, plant particles and/or plant dust or shake from any plant such as but not limited to any herbs, bushes, trees, or flowering plants such as cannabis and sage.

As depicted in the embodiment of FIG. 7, after shaking and sifting undesirable plant matter, or cannabis particles such as "shake" out, the scooper 10 may be inserted into another bag 50 and the sifted material 52 may be dumped into the bag 50. The front scoop area 40 at the front of the device can be fit into the bag 50 and the material 52 can be dumped into the bag 50 by tilting the scooper 10 forward.

As depicted in the embodiment of FIG. 8, a sifting system 60 may include a combination scooper and sifter 10 and a collection container 62. Embodiments of a collection container 62 may be a can or basket, and may have an upper rim 66 that corresponds to all or a portion of the rim 30 of the scooper 10. The walls 16 and front lip 18 of the scooper 10 extend into collection container 62 to prevent spillage of material that drops out the bottom. A gap 64 between the rim 30 of the scooper 10 and the upper rim 66 of the collection container 62 allow the user to shake the scooper 10 yet keep the scooper 10 in place. The shape of all or some of upper rim 66 may match the rim 30 of the scooper 10. Embodiments may include one or more additional sifting screens or mesh screens, along the length of the container or at the bottom of the container, to increase sifting possibilities.

Figure 9:
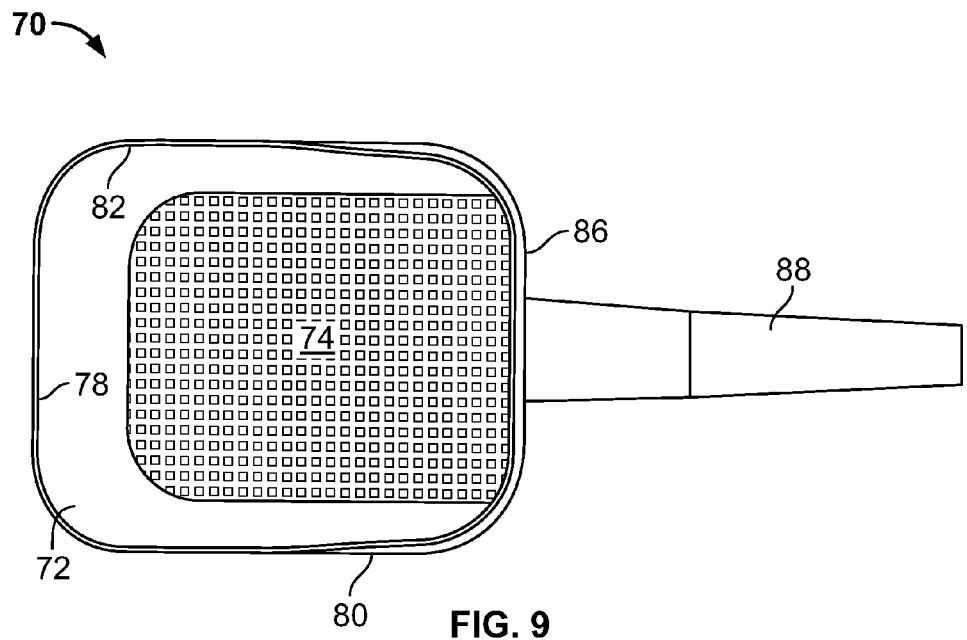
FIG. 9 depicts a top view of another embodiment of the present invention.
Figure 10:
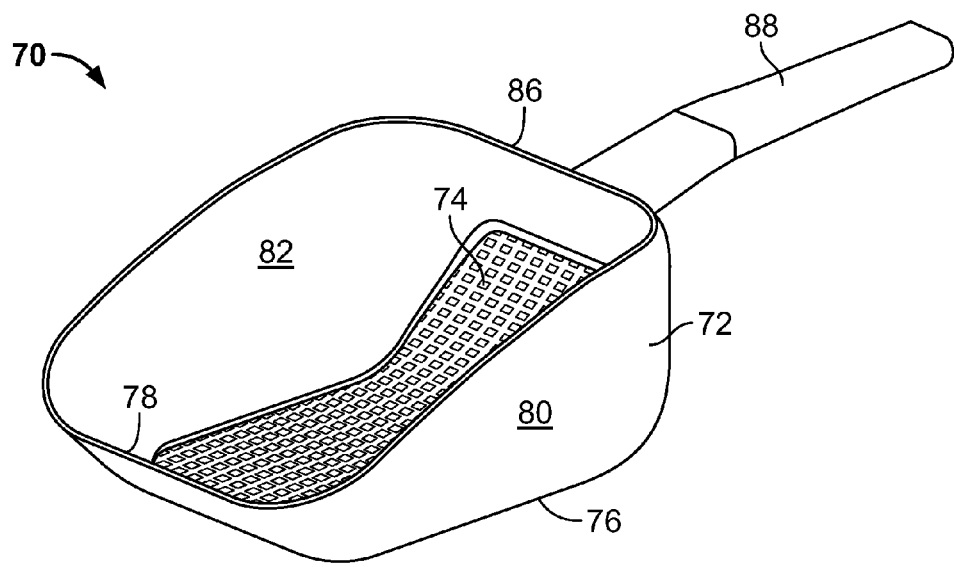
FIG. 10 depicts a perspective view of the embodiment of FIG. 9.

As depicted in FIGS. 9 and 10, embodiments of a combined scooper and sifter 70 may have a solid frame 72, a bottom 76, a left wall 80, a right wall 82, a rear wall 86, a front lip 78, and a mesh screen 74 that covers part of the bottom 76 and also part of a the rear wall 86. Mesh screen 74 may be angled or bent so that a lower portion covers the bottom 76 and an upper portion extends up onto the real wall 74. The walls steeply extend down to the mesh screen 74, and the front lip 78 extends down at a lesser angle and gently slopes down to the mesh screen 74 at the bottom 76. Embodiments of a frame may include further mesh screen elements, or may be composed of mesh screen.

Figure 11:
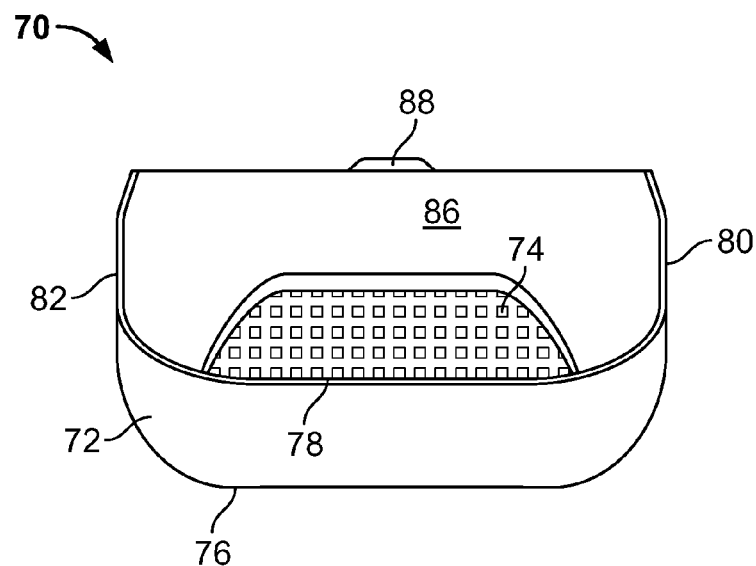
FIG. 11 depicts a front view of the embodiment of FIG. 9.
Figure 12:
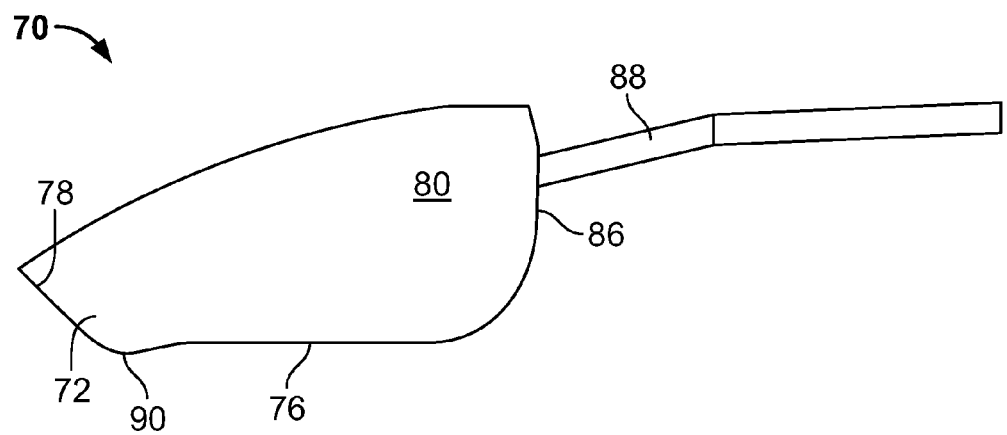
FIG. 12 depicts a side view of the embodiment of FIG. 9.

As depicted in the embodiment of FIGS. 11 and 12, the left wall 80, right wall 82, and rear wall 86 may be generally straight up and down with have a curved lower portion that terminates in the flat bottom 76. The front lip 78 slopes up more gently than the left, right, or rear walls to provide a front scoop area.

As depicted in the side view of FIG. 12, the profile from the side of an embodiment of a scooper 70 may have a flat bottom 76 at the rear and center of the frame 72, with a trough or hump-like portion 90 that may align with the front of the mesh screen 74. The top of the frame 72 may generally curve downward from the back to the front.

Figure 13:
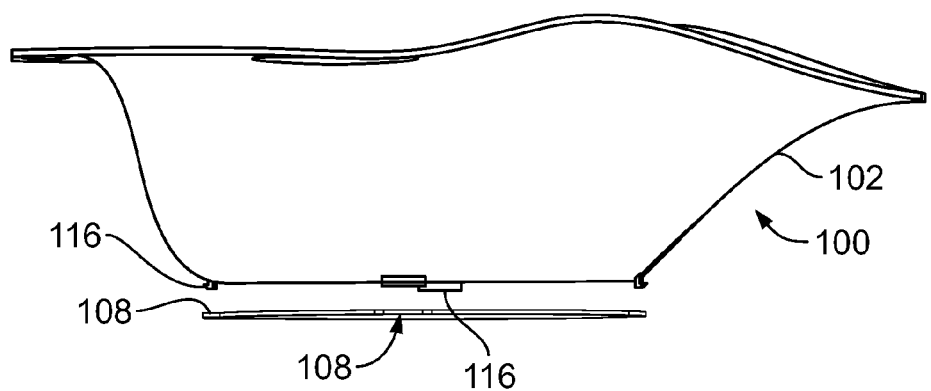
FIG. 13 depicts a side view of another embodiment of the present invention.
Figure 14:
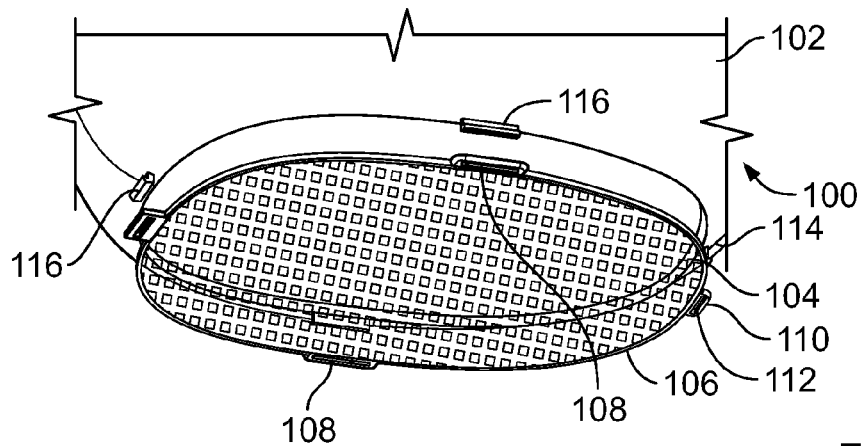
FIG. 14 depicts an underneath, perspective view of the embodiment of FIG. 13.
Figure 15:
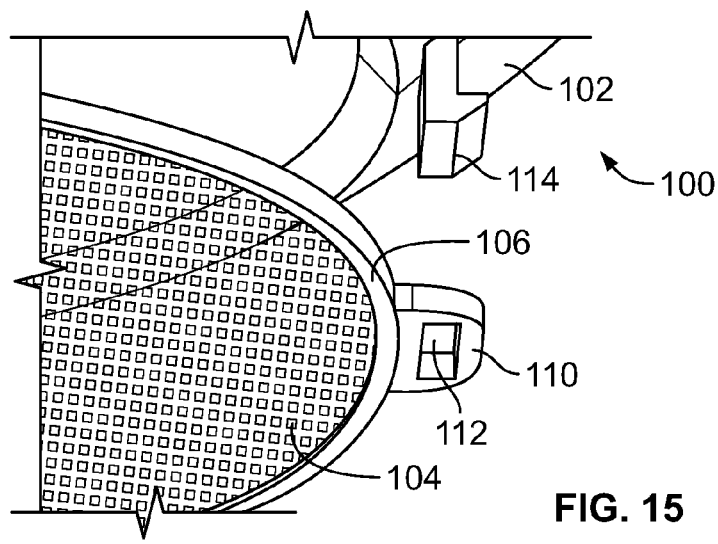
FIG. 15 depicts a closer view of the embodiment of FIG. 13.

The embodiment of FIGS. 13, 14, and 15 depict an embodiment of a sifter system 100 having a sifter/scooper 102 similar to the embodiment as described in FIG. 1. The sifter system 100 may include a removable mesh screen 104, having a rim 106 with 3 tabs 108 (front, left, and right) and a rear connecting tab 110 with an aperture 112. The frame 102 includes a receptacle flange 114, similar to a hook, which slips into the aperture 112 in the rear connecting tag 110 of the mesh screen 104. The frame 102 of the system 100 includes 3 connecting flanges 116 that engage with each of the tabs 108 of the screen 104. The connecting flanges 116 may be smaller than or the same as the receptacle flange 114.

I claim:

1. A device comprising:
   a solid frame having a top, a bottom, a front, a rear, a left, a right, and a plurality of flanges on the frame;
   a mesh screen at the bottom of the frame, the mesh screen including a screen rim having a plurality of tabs that correspond to the flanges, so that the flanges releasably engage with apertures in the tabs so as to releasably hold the mesh screen to the frame;
   a rim at the top of the frame that extends around the rear, left, and right of the frame;
   a rear wall at the back of the frame that extends down from the rim to the mesh screen at a steep, first angle;
   a lip at the front of the frame that extends down from the front of the frame to the mesh screen at a shallow, second angle which is substantially less than the first angle at the back of the frame;
   a front section at a front of the rim that slopes down to a front tip of the frame;
   a rear section at a rear of the rim that is generally flat; and
   a bulging section in the frame near the front of the mesh screen.

2. The device of claim 1, wherein the bulging section of the frame includes:
a hump-like, middle section in the top of the rim between the front and rear sections of the rim that smoothly rises and lowers to provide a hump.

3. The device of claim 1, wherein the bulging section of the frame includes:
a hump-like section in the bottom of the device that smoothly lowers and rises provide a trough.

4. The device of claim 1, wherein the left side and the right side both have an angle generally the same as the first angle of the rear wall, thereby providing a bowl-shape for a rear portion of the device.

5. The device of claim 1, wherein the wall at the back of the frame steeply extends at an angle of at least 70 degrees down to the mesh screen.

6. The device of claim 1, further comprising:
a plurality of handles in the rim, said handles spaced and shaped so that a user may grasp and shake the device.

7. The device of claim 1, further comprising:
apertures in the left, right, and rear of the frame that are large enough to provide handles for a user.

8. The device of claim 1, further comprising:
a handle that extends from the rear wall of the frame.

9. The device of claim 1, further comprising:
a mesh screen extends at least partly up the rear of the frame.

10. The device of claim 1, further comprising:
wherein the mesh screen is removably held to the frame, so that the mesh screen can be removed and replaced.

11. The device of claim 1, wherein the mesh screen has a mesh size of from $1/100$ inches to 1 inch.

12. The device of claim 1, further comprising:
a rigid container having an upper lip that conforms to at least part of the rim.

13. The device of claim 1, further comprising:
a rigid container having a generally flat upper lip that conforms to the rear section of the frame.

14. A device comprising:
a solid frame having a top, a bottom, a front, a rear, a left, and a right;
a mesh screen releasably held to the frame at the bottom of the frame;
a rim at the top of the frame that extends around the rear, left, and right of the frame;
a rear wall at the back of the frame that extends down from the rim to the mesh screen at a steep, first angle of at least 70 degrees;
a left wall at the left of the frame that extends down from the rim to the mesh screen at the first angle;
a right wall at the right of the frame that extends down from the rim to the mesh screen at the first angle;
a lip at the front of the frame that extends down from the front of the frame to the mesh screen at a shallow, second angle which is substantially less than the first angle;
a front section at a front of the rim that slopes down to a front tip of the frame;
a rear section at a rear of the rim that is generally flat; and
a hump-like, middle section between the front and rear sections of the rim that smoothly rises and lowers to provide a hump;
wherein the mesh screen further includes a screen rim having a plurality of tabs with apertures, and the frame includes a plurality of corresponding flanges, so that the flanges releasably engage with the apertures in the tabs so as to releasably hold the mesh screen to the frame.

15. A method for sorting a plant material, comprising:
providing a device that includes a solid frame having a top, a bottom, a front, a rear, a left, and a right, a mesh screen at the bottom of the frame, a rim at the top of the frame that extends around the rear, left, and right of the frame, a rear wall at the back of the frame that extends down from the rim to the mesh screen at a steep, first angle, a lip at the front of the frame that extends down from the front of the frame to the mesh screen at a shallow, second angle which is substantially less than the first angle at the back of the frame, a front section at a front of the rim that slopes down to a front tip of the frame, a rear section at a rear of the rim that is generally flat, and a hump-like, middle section between the front and rear sections of the rim that smoothly rises and lowers to provide a hump, wherein the mesh screen further includes a screen rim having a plurality of tabs with apertures, and the frame includes a plurality of corresponding flanges that releasably engage with the apertures in the tabs;
engaging the flanges with the apertures in the tabs to hold the mesh screen to the frame;
inserting the lip of the device into a bag containing the plant material;
removing the plant material from the bag into the device, the plant material having larger plant parts and smaller plant parts; and
shaking the material using the device so that the smaller plant parts fall down through the mesh screen but the larger plant parts are retained in the device.

16. The method of claim 15 further comprising:
inserting the lip of the device into a second bag; and
dumping the larger plant parts that are retained in the device into the second bag.

17. The method of claim 15 further comprising:
providing a rigid container having an upper lip that conforms to at least part of the rim; and
aligning the device with the container so that the rear, left, and right of the frame extend down into the container;
so that when the user shakes the material the smaller plant parts fall down into the rigid container.

18. The method of claim 15 further comprising:
further shaking the material using the device so that the hump-like middle section of the rim helps retain the larger plant parts within the device.

19. The method of claim 15 further comprising:
disengaging the flanges on the frame from the apertures in the tabs to release the mesh screen from the frame.

* * * * *